Oct. 21, 1924.  1,512,388
T. WRIGHT
STOOKER
Original Filed May 2, 1919  6 Sheets-Sheet 1
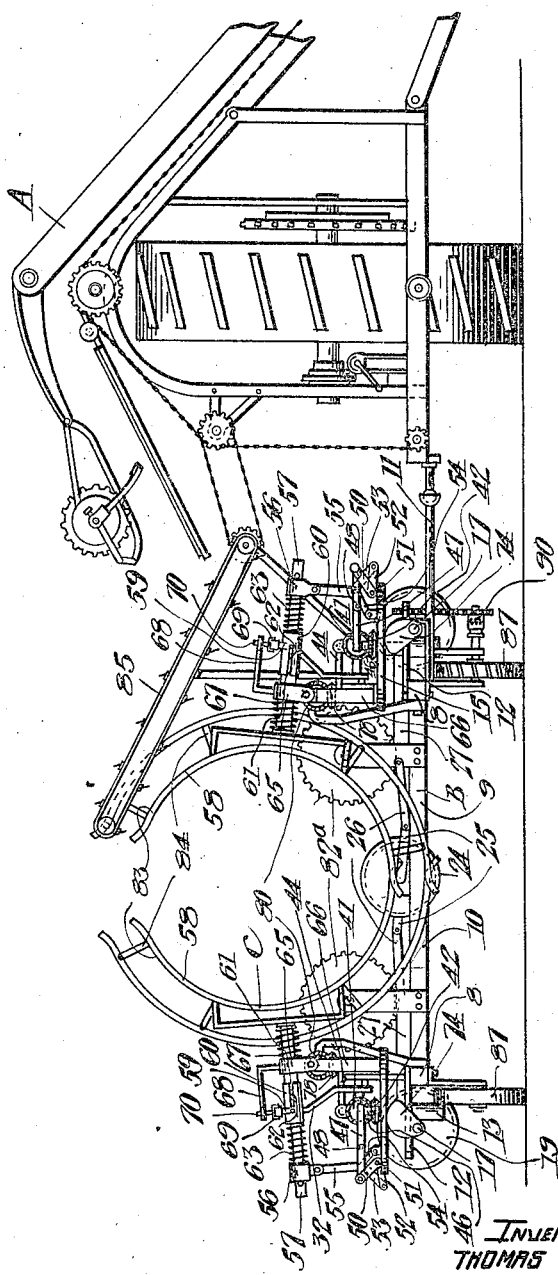
WITNESSES
INVENTOR
THOMAS WRIGHT
BY Fetherstonhaugh & Co.
ATTYS.

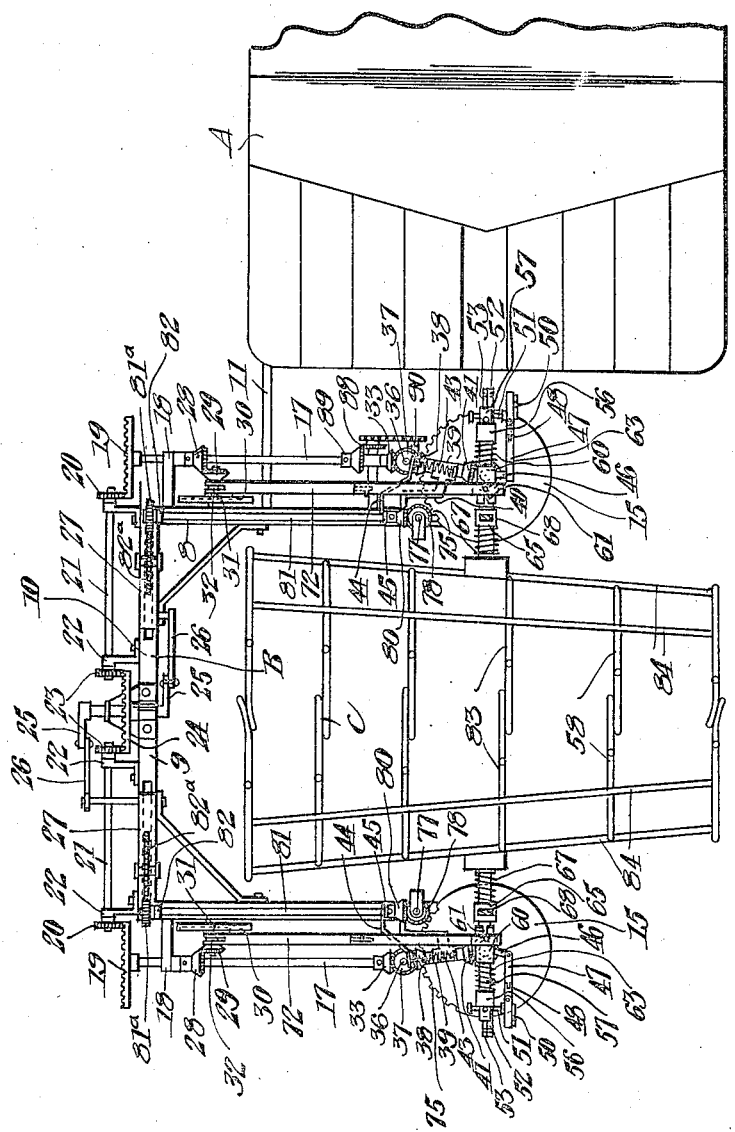

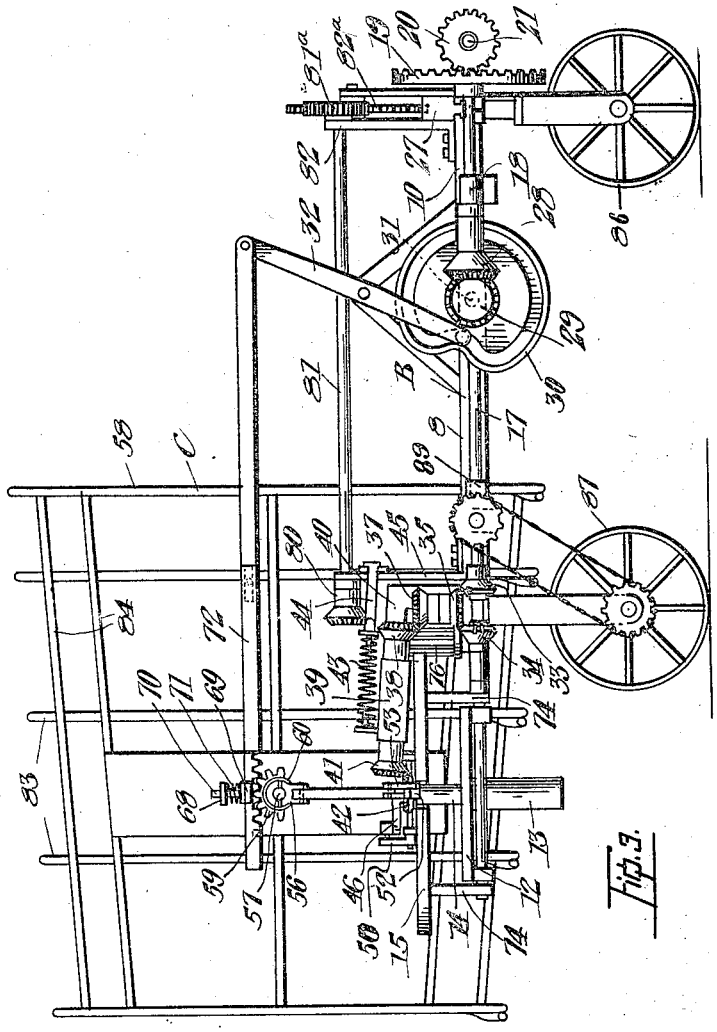

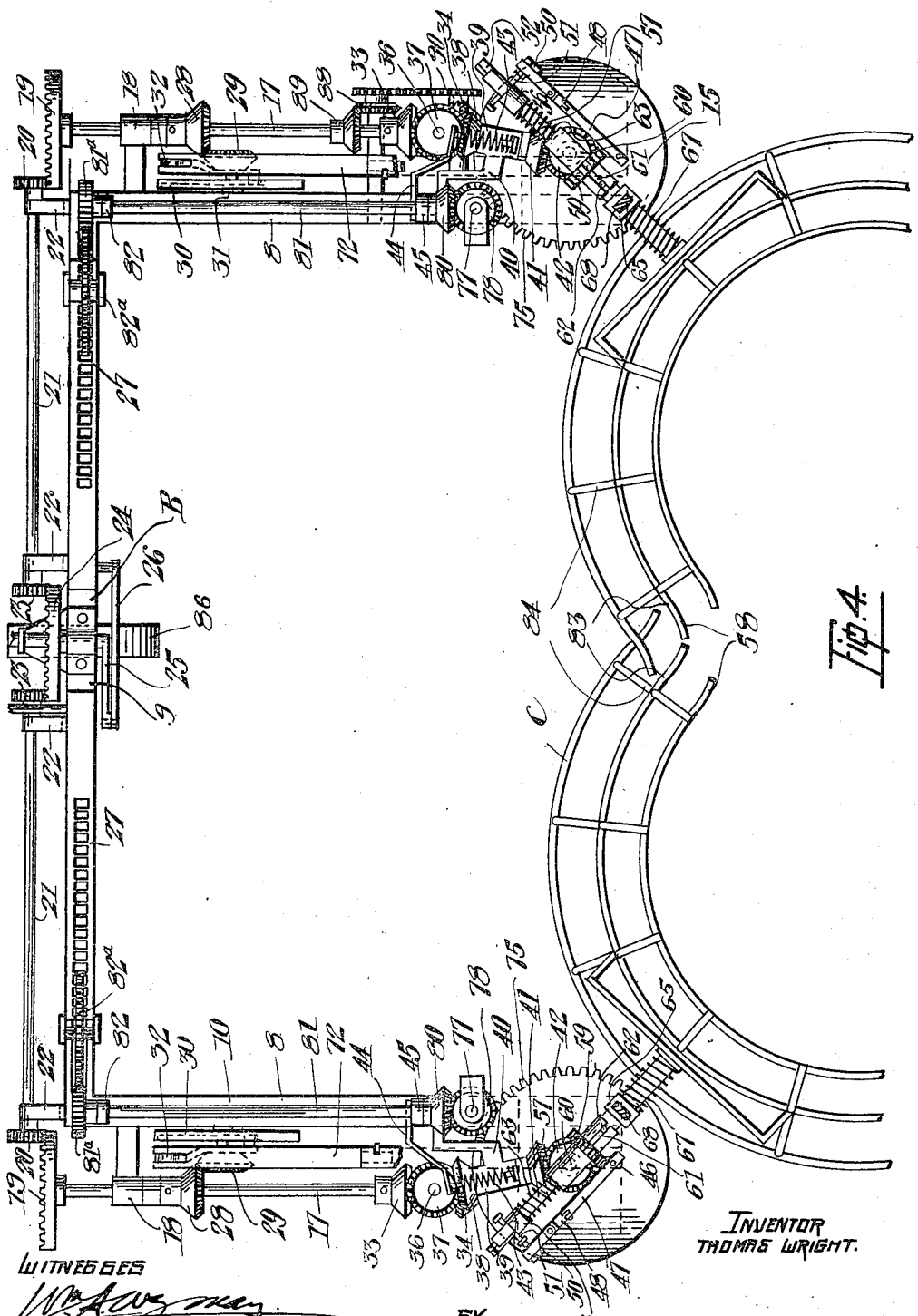

Oct. 21, 1924.                      1,512,388
                  T. WRIGHT
                   STOOKER
       Original Filed May 2, 1919   6 Sheets-Sheet 5
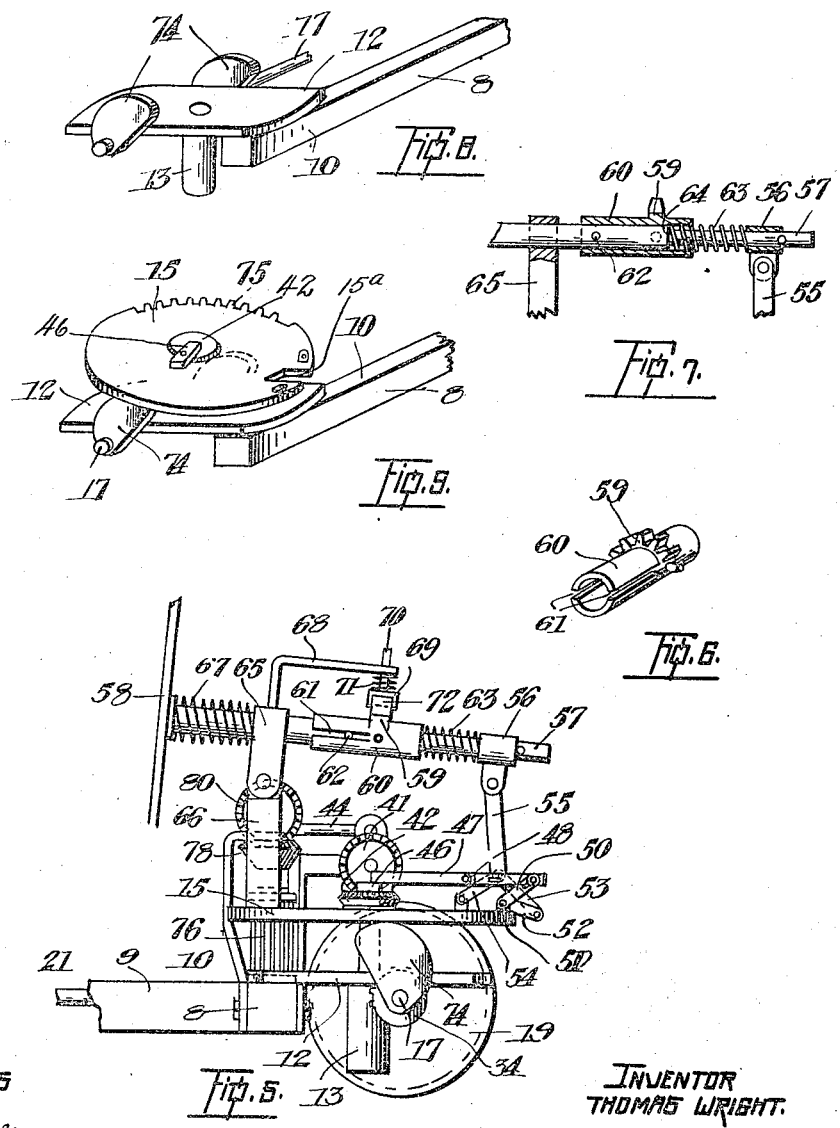

Oct. 21, 1924.
T. WRIGHT
STOOKER
Original Filed May 2, 1919    6 Sheets-Sheet 6
1,512,388
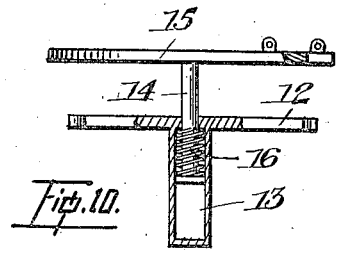
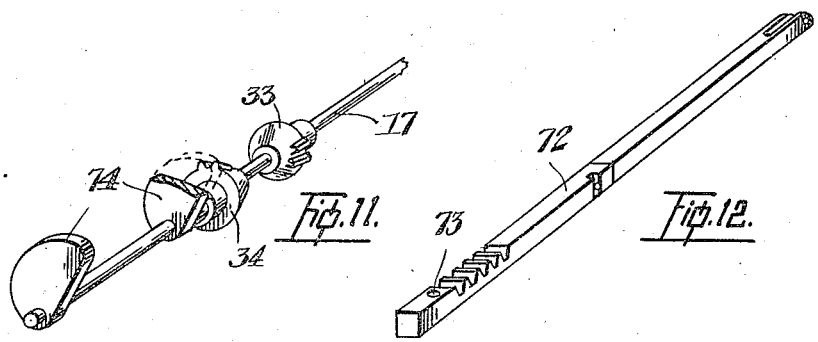
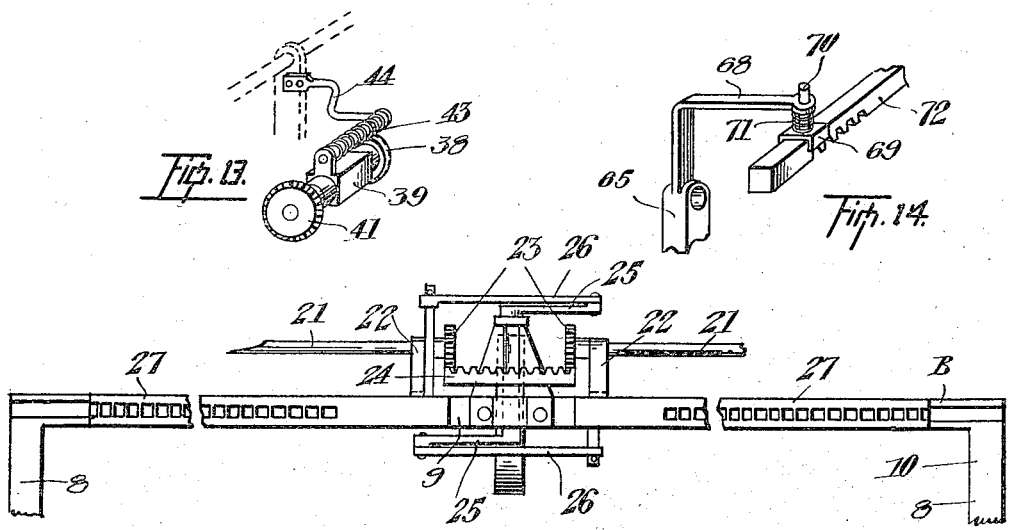
INVENTOR
THOMAS WRIGHT
BY Featherstonhaugh & Co.
ATTYS.

Patented Oct. 21, 1924.

1,512,388

UNITED STATES PATENT OFFICE.

THOMAS WRIGHT, OF EYEBROW, SASKATCHEWAN, CANADA.

STOOKER.

Application filed May 2, 1919, Serial No. 294,233. Renewed November 20, 1920. Serial No. 425,559.

*To all whom it may concern:*

Be it known that I, THOMAS WRIGHT, a subject of the King of Great Britain, and resident of the village of Eyebrow, in the Province of Saskatchewan, Dominion of Canada, have invented certain new and useful Improvements in Stookers, of which the following is a specification.

This invention relates to improvements in stookers, and the objects of the invention are to facilitate collecting a plurality of sheaves of grain and holding them together and dump the collected sheaves in a manner best calculated to form a proper stook, to provide means whereby the sheaf collecting or receiving means will adequately clear the stook after dumping and not tend to knock over or otherwise distribute the same, and to so compress the sheaves that they will be bunched together at the heads while the butts will be allowed to separate to a limited extent, so that the sheaves incline towards each other at the heads, and an adequate grip is obtained on the ground by the butts.

Further objects are to permit of the sheaf collector being controlled in such a manner that it will receive any number of sheaves between a certain minimum and maximum number, so that stooks of unequal size can be readily handled, the size of the stooks depending on the crop of grain being harvested, and the grain in different portions of the field may be thick or thin and thus differ, variation in a crop being exceedingly marked in certain parts of fields.

Further objects still are to automatically control the sheaf collector, so that the timing cannot go out of order in any way, and stooks can thus be set up with regularity and without any possibility of failure.

Heretofore great inconveniences have arisen due to the fact that automatically controlled stookers must dump the load irrespective of the position of the machine at the time the desired predetermined number of sheaves have been collected, with the result that the stooks are not set up in straight rows but are scattered all over the fields, so that stook loaders cannot be used under such circumstances, and this objection is eliminated in the present machine by providing that the stooker is manually controlled and provision is made for receiving a varying number of sheaves in the collector, so that each time the machine comes to a row the sheaves collected can be dumped in the form of a stook, and that without interrupting with the operation of the binder, etc.

With the above and other objects in view the invention consists essentially of the improved construction hereinafter described and set forth in the following specification and accompanying drawings forming part of the same.

In the drawings:

Figure 1 is a fragmentary rear view of a binder showing the improved stooker thereon.

Figure 2 is a plan view of the same.

Figure 3 is an enlarged side elevation of the stooker.

Figure 4 is a plan view of the stooker with the basket collector open after dumping the stook.

Figure 5 is an enlarged rear elevation of the compressor and basket collector opening and closing mechanism.

Figure 6 is a perspective view of an arcuate rack controlling the vertical rotation of the basket collector.

Figure 7 is a longitudinal section of the arcuate rack and the basket supporting spindle.

Figure 8 is a fragmentary perspective view of the stooker frame showing the turn table support and cams.

Figure 9 is a perspective view of the turn table in elevated loading position.

Figure 10 is an elevation of the turn table support, being in section to show the spring controlling the forced drop of the turn table.

Figure 11 is a perspective view of the cam shaft and bevel gears thereon designed to control the compression mechanism, and the opening of the basket collector to the sheaf receiving position.

Figure 12 is a perspective view of a connecting rod for rotating the basket collector in a vertical plane.

Figure 13 is a perspective view of the gears for operating the compression mechanism.

Figure 14 is a fragmentary perspective view of the connecting rod shown in Figure 12 with the guide bracket coacting therewith.

Figure 15 is a fragmentary plan view of the stooker frame showing the racks and gears controlling the opening and closing of the basket collector.

Like characters of reference refer to like parts in the several figures.

Referring to the drawings, A represents a binder of any usual construction, and B the improved stooker secured thereto and extending stubbleward thereof, the stooker frame 10 being connected to the frame of the binder A by rods 11 or the like, in such a manner that the stooker will have the desired flexibility, so that, should the machine be passing over uneven ground, there is no possibility of jarring and otherwise destroying the stooker mechanism.

The frame 10 is substantially U-shaped being provided with a forward transverse member 9 and rearwardly extending side members 8, and the rear of the frame is open to allow of the sheaves being dumped in such a manner that the basket collector will clear the stook when it has been placed on the ground.

On the side members 8 of the frame 10 and toward the rear thereof I provide turn table supports 12, which are rigidly secured to the said side members and provided with a central downwardly extending tubular portion 13 adapted to house the spindle 14 of the turn table 15 which is provided with a peripheral notch 15ª, the said spindle having a spring 16 coiled therearound whereby the table 15 will be returned under pressure to a lowered position in a manner to be made clear hereafter.

It will be readily noticed by reference to the drawings and particularly to Figure 4 that the right and left hand sides of the machine are duplications of each other, so that it is only necessary to describe the mechanism of one side, as the mechanism of the opposite side would be substantially the same.

On each turn table support 12 a shaft 17 is rotatably mounted and arranged in parallel relation to the rearwardly extending side member 8 of the frame 10, being spaced therefrom and journalled at the front end in a bearing 18.

The front end of the shaft 17 overhangs the bearing 18 and is provided with a gear 19 which meshes with a gear 20 carried by a transversely extending shaft 21 arranged in front of the transverse member 9 of the frame 10, the said shaft being journalled in bearings 22.

That end of the shaft 21 remote from the gear 20 is provided with a gear 23 designed to mesh with a gear 24 carried by a crank shaft 25 rotatably supported from the frame 10, the said crank shaft being provided with two crank arms arranged diametrically opposite each other, each of the arms being connected by a connecting rod 26 with rack 27 slidably mounted on the transverse member 9 of the frame 10, but on opposite sides of the crank shaft.

Each shaft 17 is provided intermediate of its length with a bevel gear 28 adapted to mesh with a bevel gear 29 carried by a cam 30, which is rotatably mounted on a stub spindle 31 on the side members 8 of the frame 10, and coacting with this cam is a pivotally mounted lever 32.

Adjacent to the turn table support 12, each shaft 17 is provided with a pair of spaced gears 33 and 34, each of which has only two teeth, and the teeth of one gear are angularly disposed relatively to the teeth of the other gear, and meshing with these gears is a bevel gear 35 carried by a vertically disposed spindle 36 on the upper end of which a bevel gear 37 is mounted.

The bevel gear 37 meshes with a bevel gear 38 carried by a spindle rotatably mounted in the bearing 39 which is supported by a bracket 40 mounted on the side member 8 of the frame 10, and at the opposite end of the bearing 39 a bevel gear 41 is provided on the same spindle that carries the gear 38.

The bevel gear 41 meshes with a bevel gear 42 loosely mounted on a stub spindle on the turn table 15.

The bearing 39 is held in the desired position, so that the gear 41 will mesh with the gear 42 with the desired pressure, and to this end I provide a spring 43 secured at one end to the bearing 39, the other end of the spring being anchored to an arm 44 on a standard 45 mounted on a side member 8 of the frame 10.

It should be particularly noted that the bevel gear 42 is loosely supported on the stub spindle of the turn table 15, and is provided with a crank arm 46 connected to a link 47 which is formed intermediate of its length with a universal joint 48.

The other end of the link is connected with a crank arm 50 carried by a small crank shaft 51 which is provided intermediate of its length with a second crank arm 52 designed to be connected through the link 53 with the hinge joint of a pair of links 54 and 55, the former of which is pivoted to the upper face of the turn table 15, and the latter to the collar 56 slidably mounted on a spindle 57 which supports one half 58 of the basket collector C.

On the spindle 57 an arcuate rack 59 is mounted, formed with an integral sleeve 60 having longitudinal slots 61 therein designed to engage with pins 62 on the periphery of the spindle, which is slidable within the sleeve, and on rotation of the rack the spindle 57 and consequently the half of the basket collector carried thereby is rotated through a right angle, so that the basket collector C is in a vertical position with its larger end adjacent to the ground.

On the spindle 57 a spiral spring 63 is mounted, engaging at one end with a shoulder 64 on the spindle and at the other end with the collar 56 which is capable of being moved inwardly on the spindle by the link mechanism on the turn table 15, but the outward movement of the collar is limited by a pin on the spindle.

On the inward movement of the collar pressure is brought to bear on the spring which transmits it to the shoulder 64 and moves the spindle longitudinally so that the two halves of the basket collector are thus moved nearer to each other to compress the sheaves collected therein.

The spindle 57 is rotatably supported in a bearing 65 pivotally mounted on a standard 66 carried by the turn table 15 and a second spiral spring 67 is mounted on the spindle and located between the basket and bearing 65 to give a cushioning effect when the compression is removed from the basket collector.

The bearing 65 is formed with an offset arm 68 overhanging the arcuate rack 59, and carries a slidably mounted guide 69 of inverted U-shape, provided with a pin projection 70 which slidably engages the arm 68, and between the U-shaped guide and the arm a compression spring 71 is located.

The arcuate rack 59 is oscillated by the rod 72 which is connected at one end with the lever 32, the other end of the rod being formed with a rack which engages the arcuate rack and is held in engagement therewith by the guide 69.

This rod 72 is formed in two portions connected together by means of a pin on one portion fitting into a socket on the other portion so that the rod will still remain operative during the inward compressive action of the two portions of the basket collector C. At the outer end of the rack on the rod an orifice 73 is provided which pivotally engages the end pin tooth on the arcuate rack, so that during the rearward opening action of the basket the rod will not impede or retard the action.

The turn table 15 by means of which the backet C is opened rearwardly coacts with cams 74 carried by the shaft 17 and during the rotation of the shaft the table is alternately raised and lowered, and when the basket is in normal filling position the table is elevated.

The periphery of the table is provided with teeth 75 extending around the table for a minor arc of the circumference and these teeth mesh with the large gear 76 mounted on the spindle 77 which is provided at the upper end with a gear 78 designed to mesh with a gear 80 carried by the shaft 81 rotatively supported at the rear end by the standard 45, the forward end of the shaft being rotatively mounted in the standard 82.

The forward end of the shaft 81 carries a gear 81$^a$ meshing with the gear 82$^a$ rotatively supported from the transverse member 9 of the frame 10 and the gear 82$^a$ engages the rack 27.

As stated above the basket collector C is formed in two portions, each carried by a spindle 57 and the basket is constructed like a frustum of a cone and comprises a plurality of arcuate rods 83 having offset ends, the rods being held in spaced relation by longitudinal rods 84.

The arcuate rods 83 of each half of the basket are staggered relatively to each other so allowing the two halves to close to compress the sheaves collected.

The sheaves are delivered to the basket collector C from the binder deck by the conveyor 85 which bridges the gap between the binder and stooker and the conveyor is operated by a suitable chain drive from the binder mechanism.

The frame 10 is supported by ground wheels 86 and 87 one of the latter of which is provided with a suitable chain and sprocket drive by means of which the bevel gears 88 and 89 are driven, so that the operation of the stooker does not depend in any way on the operation of the binder but on the contrary the stooker is a self-contained machine.

When the sheaves are being delivered to the basket collector C the chain and sprocket drive will be inoperative, but a clutch means 90 of any suitable description is provided, which clutch is manually operated to bring the chain and sprocket drive into operation for the purpose of bunching the sheaves together in the form of a stook and dumping the same.

Just before the machine reaches a row in which the sheaves have to be dumped the operator actuates the clutch mechanism 90, so that motion is transmitted from one of the ground wheels 87 through the chain drive to the gears 88 and 89, thus rotating the shafts 17, and the cams 74 will be rotated with the said shaft thus allowing the turn tables 15 to be lowered under action of the springs 16.

The motion of the shaft 17 is transmitted through the gear 34, which, on meshing with the gear 35, rotates the same and also the gear 37, and thus rotary motion is transmitted through the gears 38 and 41 to the gear 42 which rotates the crank arm 46 through a limited arc and transmits a pull to the link 47.

The link 47 rocks the crank shaft 51, and the crank 52 transmits a push to the link 53 and links 54 and 55, so that the collar 56 is moved longitudinally on the spindle 57, and the pressure applied by the collar to the spring 63 causes the spindle to be moved longitudinally through the bearings 65, so that a compressive force is applied to the two portions 58 of the basket collector C.

The crank 52 and link 53 will during any rocking action of the said crank obtain the necessary clearance from the turn table 15 as they operate in the notch 15ª provided in the periphery of the said turn table.

When this push is applied to the links 54 and 55 the spindle 57 will rock on the bearing 65, and the upper longitudinal edges of the basket will close together, and this combined longitudinal movement and rocking of the spindle simultaneously closes the two portions 58 of the basket collector C and compresses the sheaves collected therein.

This action, it will be understood, is carried out in the space of a few seconds.

The next movement of the basket collector C is to rotate it from a horizontal into a vertical position, and this is also performed by the rotation of the shaft 17, which transmits rotary motion to the gears 28 and 29 and the cam 30, and this cam oscillates the lever 32 thus transmitting longitudinal motion to the rod 72, the rack of which meshes with the arcuate rack 59.

The longitudinal movement of the rod 72 rocks the arcuate rack 59, and since the sleeve 60 coacts with the spindle 57 by means of the slots 61 and pins 62, the spindle will be rotated through one-quarter of a revolution, and the basket collector C will now assume a vertical position with its larger end adjacent to the ground.

This is the position of the basket collector C prior to the dumping of the sheaves collected therein. During the dumping of the sheaves it is essential that the basket collector C should adequately clear the same, so that there is no possibility of the stook being knocked down or otherwise destroyed, and this is adequately taken care of by giving the two halves 58 of the basket collector C a rearward motion which compensates for the forward motion of the machine.

This rearward motion of the two halves of the basket collector is provided by the turn table 15, which is rotated through part of a revolution by a gear 76 engaging with the teeth 75, and the gear 76 is rotated by the intermeshing gears 78 and 80 the latter of which is carried by the shaft 81.

The shaft 81 receives its motion from the gear 81ª meshing with the gear 82ª which in turn meshes with the rack 27.

The racks 27 as has been previously explained are reciprocated to and fro on the transverse member 9 on the frame 10 by the crank shaft 25, which is driven by the shaft 21, which in turn is rotated from the shaft 17 by the intermeshing gears 20 and 19.

During the dumping operation the two halves 58 of the basket are opened and will assume the position shown in Figure 4, in which it will be readily seen that the crank arms of the crank shaft 25 are on dead center, so that, on the forward movement of the machine and until the crank arms have passed the dead centers to a perceptible extent, there will be practically no movement of the racks 27, and thus sufficient time is allowed the two halves 58 of the basket to remain open to clear the stook.

In practice the machine actually travels about four or five feet forwardly before the crank shaft 25 has rotated a sufficient distance to permit of the connecting rods 26 moving the racks 27 to a perceptible extent, to start closing the two halves 58 of the basket collector C.

When, however, the racks 27 do start to move, this movement is rapid and the closing of the basket is effected very quickly.

When the basket collector is in the open position the rod 72 will be in such a position that a pin tooth on the arcuate rack 59 will be engaged by the orifice 73, and thus the arcuate rack does not impede the rotary motion of the turn table 15 by the interlocking of the teeth of the racks. The basket is closed before being rotated into a horizontal plane and the arcuate rack 59 is thus brought back into alignment with the rod 72 before the vertical rotating operation starts.

After the sheaves have been dumped in the form of a stook, and the basket collector has cleared the said stook, the turn table 15 is rotated in a direction opposite to that in which it was primarily rotated to open the basket, and this motion depends on the reciprocation of the racks 27, and, when the turn table has been rotated to bring the two halves of the basket into closed position, the basket will still be in a vertical plane.

The arcuate rack 59 is now in alignment with the rod 72 and on the continued rotation of the cam 30, the lever 32 will be oscillated, so that the rod 72 will now rotate the arcuate rack 59 and so rotate the basket collector C into a horizontal position.

The turntable 15 will now have been elevated by the rotation of the cam 74, and the link mechanism on the turn table will have been actuated by the crank arm 46 to release the compression from the two halves 58 of the basket collector, so that while the lower longitudinal edges of the two portions of the basket remain in engagement, the upper longitudinal edges of the said basket will be open for about three feet, and thus allow the sheaves carried by the conveyor 85 to be delivered to the basket collector.

The compression of the basket collector C can be adjusted by moving the collar on the spindles and so altering the compression of the springs.

From the above description it will be seen that I have invented a stooker which is compact in construction and capable of being attached to any binder and wherein provision is made for the basket collector to clear the stook when dumped.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A stooker comprising a basket collector formed like the frustrum of a cone and in two portions, formed of arcuate rods and longitudinal rods, the arcuate rods having offset ends designed to coact, means for rotating the basket collector in a vertical plane through one-quarter of a revolution, and means for opening the basket collector rearwardly to clear the stook when dumped.

2. A stooker, comprising a basket collector formed in two portions, each supported by a spindle, means for moving the spindles and simultaneously tipping the same to close the basket and compress the sheaves therein, means for rotating the spindle through one-quarter of a revolution, and means for swinging the spindles in a horizontal plane whereby the basket is opened rearwardly to clear the dumped stook.

3. A stooker, comprising a basket collector formed in two portions, a spindle operatively supporting each of the portions, link means for controlling the longitudinal movement of the spindles, and simultaneously tipping the same whereby the two portions of the basket are compressed and closed, and means for rotating the spindles in a horizontal plane whereby the two portions of the basket are moved rearwardly and opened to clear the dumped stook.

4. A stooker comprising a basket formed in two portions, rotatable turn tables, means for adjusting the turn tables in a vertical direction, means on the turn tables supporting the basket, means cooperating with the said means whereby the basket is closed and compressed, and means for dumping the basket.

5. A stooker, comprising rotatable turn tables, means for elevating the turn tables, means for lowering the turn tables when the last said means is inactive, a basket collector formed in two portions supported from the turn tables, means for rotating the basket collector in a vertical plane, said basket collector being designed to be opened rearwardly during the dumping of the stook, whereby the basket collector will clear the stook.

6. A stooker comprising turn tables, cam means for elevating the turn tables, a basket collector supported by the turn tables, the basket collector being formed in two portions, means for rotating the basket collector in a vertical plane, the said basket collector being designed to be opened rearwardly during the dumping operation, to compensate for the forward movement of the machine whereby the basket collector will clear the stook.

7. A stooker comprising a basket collector formed in two portions, a spindle rigidly attached to each portion, means for moving the spindles longitudinally and tilting the same, and rod and rack means for rotating the spindles to dump the sheaves in the basket collector.

8. A stooker comprising a basket collector formed in two portions, a spindle rigidly attached to each portion, means for moving the spindles longitudinally and tilting the same, curvilinear rack means on the spindle, a rod having a rack coacting with the said rack means, and cam and lever means for actuating the said rod.

9. A stooker of the class described, comprising a frame, turn tables on the said frame, cam means for elevating the turn tables, resilient means for lowering the turn tables, a basket formed in two portions, each turn table supporting a portion, means for rotating the turn tables through an arc, and means for rotating the basket in a vertical plane.

10. A stooker comprising a pair of turn tables, a basket formed in two portions, each portion being supported by a turn table, means for rotating the turn tables through an arc of a circle, link and lever means on the turn tables for closing the basket and compressing the sheaves therein, means for adjusting the turn tables vertically and means for rotating the basket in a vertical plane.

11. A stooker comprising a basket collector formed in two portions, a turn table supporting each portion, means for adjusting the turn table vertically, rack and pinion means for rotating the turn tables, means for closing and compressing the basket, and means for rotating the basket in a vertical plane.

12. A stooker comprising a basket collector formed in two portions, turn tables supporting each of the portions, means for adjusting the turn tables vertically, rack and pinion means for rotating the turn tables, means for reciprocating the racks, means for closing and compressing the basket, and means for rotating the basket in a vertical plane.

13. A stooker of the class described comprising a U-shaped frame opening rearwardly, a basket collector formed in two portions and located adjacent to the rear of the frame, turn table means for supporting each portion of the basket, means for adjusting the turn table vertically, means for closing and compressing the basket collector, and means for rotating the basket collector in a vertical plane.

14. A stooker comprising a basket collector formed in two portions, spindles attached to each portion, means for moving the spindles longitudinally and simultaneously tilting the same, an arcuate rack slidably engaging with each spindle, a rod having rack means thereon meshing with the said rack, guide means coacting with the rod, and means for rotating the basket collector rearwardly to open the same during the dumping operation.

15. A stooker comprising a basket formed in two portions, turn tables, standards on the turn tables, bearings pivotally mounted on the standards, spindles carrying the two portions of the basket rotatably engaging with the bearings, means for moving the spindles longitudinally and simultaneously tilting the same to close the basket and compress the sheaves therein, and means for rotating the basket in a vertical plane.

16. A stooker comprising a sectional basket collector, spindles operatively supporting the sections of the basket collector, rack means on the spindles having a pin tooth, a rod having a rack coacting with the said rack means, and an orifice to engage the said pin tooth, and means for opening the basket collector rearwardly to clear the stook when dumped.

17. A stooker comprising a sectional basket collector, spindles supporting the sections of the basket collector, rack means on the spindle, a rod formed in two portions pivotally connected and having a rack coacting with said rack means, means for moving the spindles longitudinally and tilting the same, and means for opening the basket collector rearwardly to clear a stook when dumped.

18. A stooker comprising a sectional basket collector, spindles supporting the sections, collar means on the spindles, means for moving the collar means longitudinally to compress the sections of the basket collector and tilt the spindles to close the sections, means for rotating the basket collector in a vertical plane, and means for opening the basket collector rearwardly to clear a stook when dumped.

19. A grain shocker having a sheaf receiving receptacle for receiving the sheaves in substantially horizontal position, means for actuating said receptacle to compress the sheaves into a shock and grip the same, means for turning the receptacle to a substantially vertical position, mechanism for dropping the receptacle to deposit the shock upon the ground, and means for simultaneously opening the receptacle and moving portions of it backward to compensate for the forward motion of the shocker and to momentarily hold the shock in position, said several means and mechanisms being arranged to return the sheaf receiving receptacle to normal position after the shock has been deposited.

20. A grain shocker having a sheaf receiving receptacle formed in two portions normally in horizontal position and separated at the top to provide an opening for the entrance of sheaves, means for closing the two portions and compressing the sheaves therein, means for rotating the device to a substantially vertical position, means for dropping the device to deposit the shock on the ground, and mechanism for simultaneously rotating the two portions of the shock receiving device rearwardly to open it and to compensate for the forward movement of the mechanism.

21. A grain shocker having a sheaf receiving device normally in a substantially horizontal position, means for rotating the device forwardly to a substantially vertical position, means for suddenly dropping the device downwardly, and mechanism for simultaneously opening the receptacle rearwardly and moving portions of it rearwardly to compensate for the forward motion of the shocker.

22. A grain shocker having a sheaf receiving receptacle normally in horizontal position, means for compressing the sheaves in said receptacle to form a shock and to grip the same, means for turning the receptacle to a substantially vertical position, means for dropping the receptacle downwardly, and mechanism for opening the receptacle rearwardly and moving it rearwardly at the same time to compensate for the forward movement of the shocker.

23. A grain shocker having a sheaf-receiving receptacle comprising movable parts, means for turning the receptacle forwardly to a substantially vertical position, and mechanism for moving the receptacle parts rearwardly and simultaneously separating their rear portions to deposit the shock.

24. A grain shocker having a sheaf receiving receptacle, means for moving said receptacle to a substantially vertical position, mechanism for suddenly dropping said receptacle downwardly to deposit the shock, and means for simultaneously moving the receptacle rearwardly and opening it rearwardly to clear the shock.

25. A grain shocker having a sheaf receiving receptacle, mechanism for moving the same to a substantially vertical position, means for suddenly dropping the receptacle to set the shock firmly on the ground, and mechanism for simultaneously opening the receptacle so that the portions of it at the rear of the shock move rearwardly away from the shock and the portions on the front side of the shock move rearwardly to compensate for the forward movement of the shocker whereby the receptacle will clear the shock and at the same time momentarily hold it in vertical position.

26. A grain shocker having a shock receiving receptacle, means for actuating the receptacle to compress the sheaves therein into a shock and to grip the shock, means for turning the receptacle to a sbstantially vertical position, mechanism for suddenly dropping the shock receptacle downwardly to firmly set the shock on the ground, and means for simultaneously opening the receptacle so that the portions thereof at the rear of the shock move rearwardly away from the shock and the portions thereof on the front side of the shock move rearwardly to compensate for the forward movement of the machine.

27. A grain shocker having a sheaf receiving basket formed in two portions, means for moving the portions of the receptacle toward each other to compress the sheaves therein and to grip the shock, means for turning the receptacle to a substantially vertical position while it is gripping the shock, means for suddenly dropping the receptacle to firmly set the shock on the ground, and mechanism for moving the two portions of the receptacle rearwardly simultaneously with the dropping action so that said portions open to the rear with the parts at the rear of the shock moving away from the shock and the parts at the front of the shock moving rearwardly to compensate for the forward movement of the shocker.

28. A grain shocker having a sheaf receiving basket formed in two portions normally in horizontal position and separated at the top to form an opening for the reception of sheaves, means for moving the portions of said receptacle toward each other to close the opening and to compress the sheaves into a shock with the heads pressed more firmly together than the butts, means for turning the receptacle to a substantially vertical position, means for suddenly dropping the receptacle to firmly deposit the shock on the ground, and mechanism for opening the receptacle at the same time it is dropped downward in such a way that the two portions separate at the rear of the shock and move away therefrom while they remain in engagement at the front of the shock and move rearwardly to compensate for the forward movement of the machine.

29. A grain shocker having a sheaf receiving basket comprised of two semi-circular portions normally lying in horizontal position, means for moving the portions bodily toward each other to compress the sheaves and grip the shock, means for turning the basket to a substantially vertical position, said basket portions and the means for compressing the sheaves and for rotating the basket being carried by a mechanism arranged to rotate and to move vertically, means for suddenly causing said mechanism to drop, and means for simultaneously rotating the mechanism, so that the sheaf receiving basket is suddenly dropped and opened rearwardly so that its rear portions are moved away from the shock and its front portions are moved rearwardly to compensate for the forward motion of the shock whereby the shock is quickly and firmly deposited on the ground and momentarily held in position and cleared by the shocker.

30. A grain shocker having a sheaf receiving basket, rotatable and vertically movable turn-tables, means on the turn-tables supporting the basket, mechanism cooperating with said means for closing the basket and comprissing the sheaves therein, other mechanism cooperating with said means for rotating the basket to a substantially vertical position, means for suddenly dropping the turn-tables, and mechanism for simultaneously rotating the turn tables, whereby the shock is quickly and firmly set on the ground and the basket opened rearwardly so that its rear portions move away from the shock and its front portions remain in contact with the shock and compensate for the forward movement of the machine.

31. A grain shocker having a sheaf receiving basket formed in two portions normally in substantially horizontal position and slightly open at the top to receive the sheaves, rotatable and vertically movable turn-tables, means on said turn-tables for supporting the basket, mechanism cooperating with said means to close the basket and compress and grip the sheaves therein, other mechanism cooperating with said means for rotating the basket to a substantially vertical position, means for suddenly dropping the turn-tables, and mechanism for simultaneously rotating the turn-tables so that the basket portions open rearwardly with their rear parts moving away from the shock to clear it and their front parts remaining in contact with the shock to steady it and to compensate for the forward motion of the machine, said various means and mechanisms being arranged to complete their cycle of operation after the shock is deposited to return the basket to sheaf receiving position.

32. A grain shocker having a sheaf receiving receptacle formed in two portions normally in horizontal position and open at the top for the reception of sheaves, means for closing and compressing the receptacle, means for moving it to a substantially vertical position, means for suddenly dropping it to firmly set the shock on the ground, and mechanism for simultaneously opening the portions of the receptacle rearwardly to clear the shock and to steady it and to compensate for the forward motion of the machine.

33. A grain shocker having a sheaf receiving basket formed in two portions normally in horizontal position and slightly opened at the top for the reception of sheaves, means for closing the basket and resiliently compressing the portions together to compress the sheaves into a shock and to grip the shock, means for rotating the basket to a substantially vertical position while the shock is gripped, mechanism for suddenly dropping the receptacle to firmly set the shock on the ground, and mechanism for simultaneously opening the receptacle rearwardly so that the rear portions of the basket move away from the shock to clear it and the front portions remain in contact with the shock to steady it and compensate for the forward motion of the machine.

In witness whereof I have hereunto set my hand in the presence of two witnesses.

THOMAS WRIGHT.

Witnesses:
RUSSEL B. BENART,
MARY E. KNOX.